(12) United States Patent
Jazdzewski

(10) Patent No.: US 8,346,870 B2
(45) Date of Patent: Jan. 1, 2013

(54) LOW-PRIVILEGE DEBUG CHANNEL

(75) Inventor: Charles P. Jazdzewski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 12/436,233

(22) Filed: May 6, 2009

(65) Prior Publication Data

US 2010/0287562 A1 Nov. 11, 2010

(51) Int. Cl.
*G06F 15/16* (2006.01)
(52) U.S. Cl. ......................................... 709/205; 709/219
(58) Field of Classification Search .................. 709/205, 709/219
See application file for complete search history.

(56) References Cited

U.S. PATENT DOCUMENTS

| | | | |
|---|---|---|---|
| 6,119,247 A | 9/2000 | House et al. | |
| 6,263,456 B1 | 7/2001 | Boxall et al. | |
| 6,324,683 B1 | 11/2001 | Fuh et al. | |
| 6,647,544 B1* | 11/2003 | Ryman et al. | 717/124 |
| 7,072,951 B2 | 7/2006 | von Klopp et al. | |
| 7,334,163 B1 | 2/2008 | Sallam | |
| 8,060,613 B2* | 11/2011 | Farber et al. | 709/226 |
| 2005/0050159 A1 | 3/2005 | Suraski | |
| 2005/0138113 A1 | 6/2005 | Brendle et al. | |
| 2005/0193264 A1 | 9/2005 | Khan et al. | |
| 2006/0101404 A1 | 5/2006 | Popp et al. | |
| 2006/0129991 A1 | 6/2006 | Kilian et al. | |
| 2006/0259898 A1 | 11/2006 | Reinhardt | |
| 2007/0150902 A1* | 6/2007 | Meyer et al. | 719/313 |
| 2007/0168997 A1* | 7/2007 | Tran | 717/129 |
| 2007/0174715 A1 | 7/2007 | Kilian | |
| 2010/0017788 A1* | 1/2010 | Bronkhorst et al. | 717/125 |
| 2010/0031167 A1* | 2/2010 | Roytman | 715/760 |
| 2010/0162049 A1 | 6/2010 | Stall et al. | |

FOREIGN PATENT DOCUMENTS

| | | |
|---|---|---|
| JP | 11085564 A | 3/1999 |
| WO | 9901819 A1 | 1/1999 |

OTHER PUBLICATIONS

"Introduction to Web Application Debugging", Retrieved at <<http://msdn.microsoft.com/en-us/library/cx6214f0(VS.71).aspx>>, Mar. 5, 2009, pp. 1-2.

"Debugging Silverlight Applications: SOS.DLL", Retrieved at <<http://blogs.microsoft.co.il/blogs/sasha/archive/2008/08/25/debugging-silverlight-applications-sos-dll.aspx>>, Mar. 5, 2009, pp. 1-5.

"Debugging Services for Silverlight Applications", Retrieved at <<http://msdn.microsoft.com/en-us/library/cc197938 (VS.95).aspx>>, Mar. 5, 2009, pp. 1-4.

(Continued)

*Primary Examiner* — Minh-Chau Nguyen

(57) ABSTRACT

A browser-based debugger application is configured to debug a second browser based application. A channel repeater module is invoked to establish a bidirectional communication channel between the debugger application and the second application. A start indication is transmitted from the second application through the channel repeater module. The second application enters a blocked wait state. A debug operation is performed on the second application. A debug request message is transmitted to the second application through the channel repeater module to cause the second application to transition from the blocked wait state to a run state and to perform a debug action indicated by the debug request message. A response to the debug request message is received from the second application through the channel repeater module. The second application transitions to the blocked wait state from the run state.

20 Claims, 14 Drawing Sheets

OTHER PUBLICATIONS

Kinsman, et al., "Debugging ASP.NET Applications", Retrieved at <<http://www.informit.com/articles/article.aspx?p=29419>>, Sep. 20, 2002, pp. 1-14.

"View HTTP Headers. Analyze HTTP Requests & Responses", Retrieved at <<http://www.httpdebugger.com/?gclid=CMvHmdHzipkCFYQ-3god8miRpg>>, Jan. 19, 2008, p. 1.

"International Search Report and Written Opinion", Mailed Date: Dec. 15, 2010, Application No. PCT/US2010/033255, Filed Date: Apr. 30, 2010, pp. 9.

Extended European Search Report received for European Patent Application No. 10772627.5, mailed on Sep. 11, 2012, 8 pages.

Randolph et al., "Advanced Debugging Techniques", Chapter 45, Professional Visual Studio® 2008, Jul. 28, 2008, pp. 759-761.

* cited by examiner

500

502 invoke a channel repeater module to establish a bidirectional communication channel between the first browser based application and a second browser based application

504 receive a start indication from the second browser based application through the channel repeater module

506 perform a debug operation on the second browser based application

LOW-PRIVILEGE DEBUG CHANNEL

BACKGROUND

A debugger is a tool which enables a programmer to monitor the execution of a program. A debugger can stop execution of a program being debugged, re-start execution of the program, set breakpoints in the program, and/or access or change values in memory. A debugger can enable a program to be run step by step (called stepping), to stop at a particular line of code when a breakpoint is encountered (breaking), and can enable the value of variables to be inspected when the program is at a breakpoint or while the program is running (inspection). Some debuggers can also modify program state while the program is running, in addition to observing and reporting on program state. Hence, debuggers can be very useful.

Debugger processes are typically provided with a relatively high level of privilege so that they are enabled to debug programs in this manner. However, this same functionality that enables a debugger to be useful for finding bugs also enables a debugger to be a useful software cracking tool that can be used to breach security, including retrieving sensitive information, evading copy protection, circumventing digital rights management, and so on. Thus, the privilege level that is provided to debugger processes must be carefully managed.

For instance, in some cases, it may be desirable to use a browser based application running at a client computer to debug an application at a server. However, applications running at a client computer typically do not have sufficient privilege to debug applications at the server. A large security issue would arise if applications running at a client did have sufficient privilege to debug applications at the server. To raise the privilege level of the client-based browser based application to a sufficient level to debug the server-based application, enabling software must typically be installed at the client computer. For example, a debug DLL (dynamic link library) or other form of debug API (application programming interface) configured to raise the privilege of the client computer-based application may need to be installed at the client computer. Such APIs may not be available for many applications. To gain access to such APIs, an application may need a user to install a more privileged debugging stack (e.g., Microsoft® ICorDebug) through a normal .MSI (Microsoft® Installer) or through referencing an ActiveX control, or may need to perform other complex processes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for enabling a browser based debugger application to debug a browser based debuggee application without requiring an elevation of privilege.

In one implementation, a method for a browser-based debugger application to debug a second browser based application is provided. A channel repeater module is invoked to establish a bidirectional communication channel between the first browser based application and a second browser based application. A start indication is transmitted from the second browser based application through the channel repeater module. The second browser based application enters a blocked wait state. One or more debug operations may be performed on the second browser based application. For example, a debug request message may be transmitted to the second browser based application through the channel repeater module to cause the second browser based application to transition from the blocked wait state to a run state and to perform a debug action indicated by the debug request message. A response to the debug request message may be received from the second browser based application through the channel repeater module. The second browser based application transitions to the blocked wait state from the run state.

In another implementation, a browser based debugger application is provided. The browser based debugger application includes a channel establisher module, a debug initiation module, and a debugger module. The channel establisher module is configured to invoke a channel repeater module to establish a bidirectional communication channel between the browser based debugger application and a second browser based application. The debug initiation module is configured to receive a start indication from the second browser based application through the channel repeater module. The debugger module is configured to perform one or more debug operations on the second browser based application. The debugger module includes a debug instruction transmit module and a debug response receiver module. The debug instruction transmit module is configured to transmit a debug request message to the second browser based application through the channel repeater module. The debug request message is configured to cause the second browser based application to transition from a blocked wait state to a run state. The second browser based application performs a debug action indicated by the debug request message. The debug response receiver module is configured to receive a response to the debug request message from the second browser based application through the channel repeater module. The second browser based application transitions to the blocked wait state from the run state.

Computer program products are also described herein for the debugger application to debug the debuggee application.

Furthermore, methods, systems, and computer program products are described herein for the debuggee application, the channel repeater module, and for further embodiments as described herein Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 shows a flowchart providing a process for a debugger application to performing debugging, according to an example embodiment.

FIGS. 9-12 which show flowcharts providing processes for initiating debugging of a debuggee application, according to example embodiments.

FIGS. 13-16 show flowcharts providing processes for performing debugging of a debuggee application by a debugger application, according to example embodiments.

Figure 17:
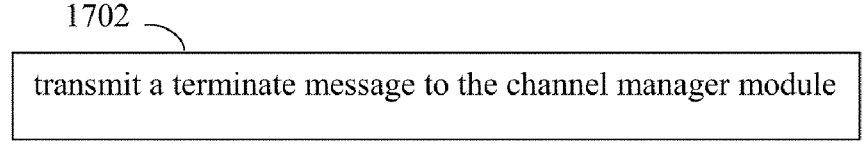
Figure 18:
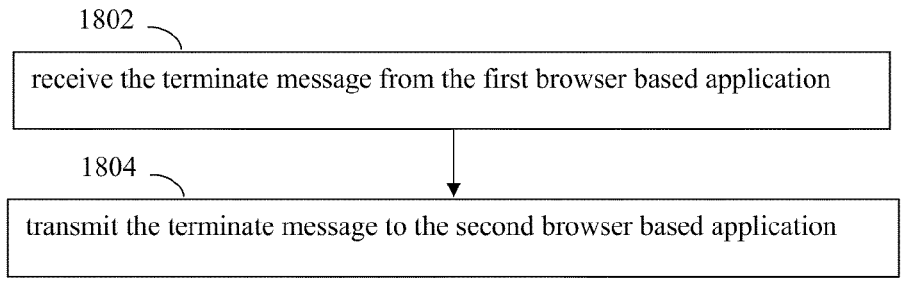
Figure 19:
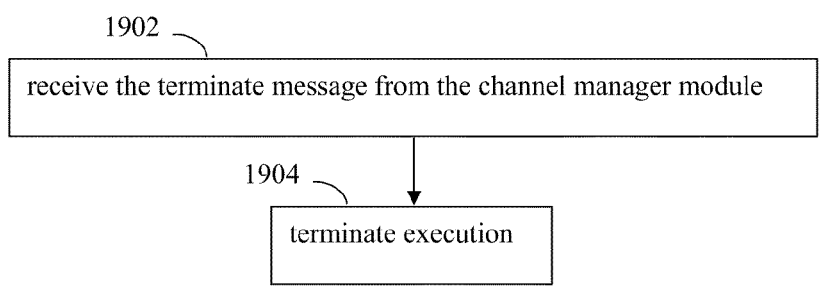

FIGS. 17-19 show flowcharts providing processes for terminating debugging, according to example embodiments.

Figure 20:
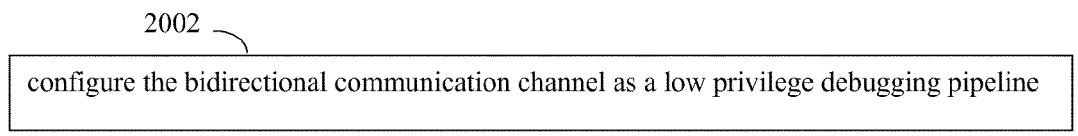

FIG. 20 shows a flowchart for configuring a low privilege debug pipeline, according to an example embodiment.

Figure 21A:
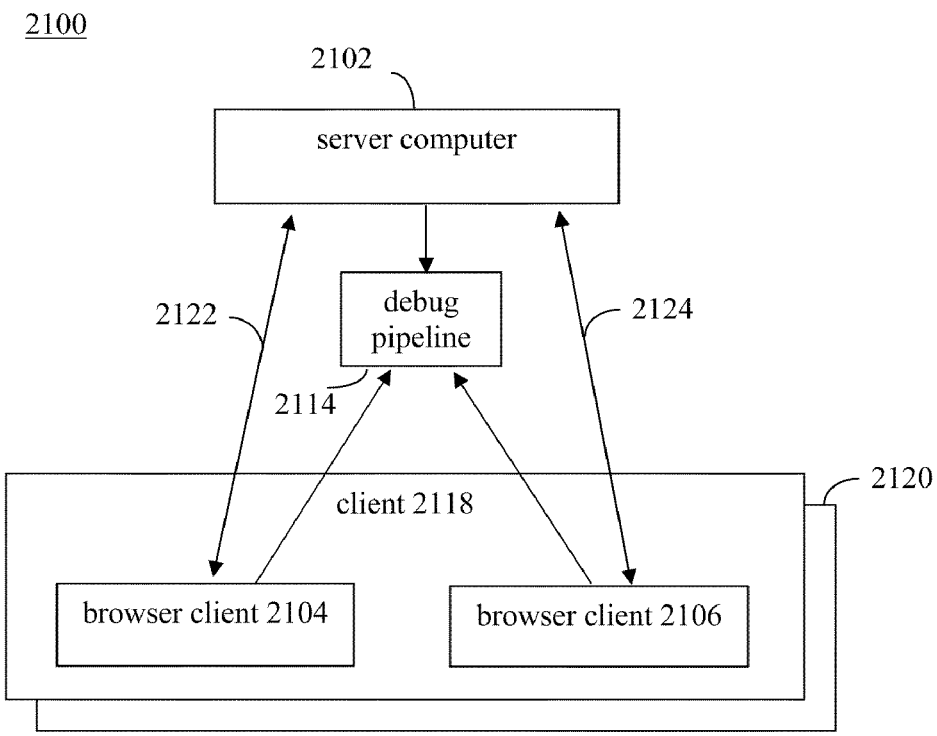
Figure 21B:
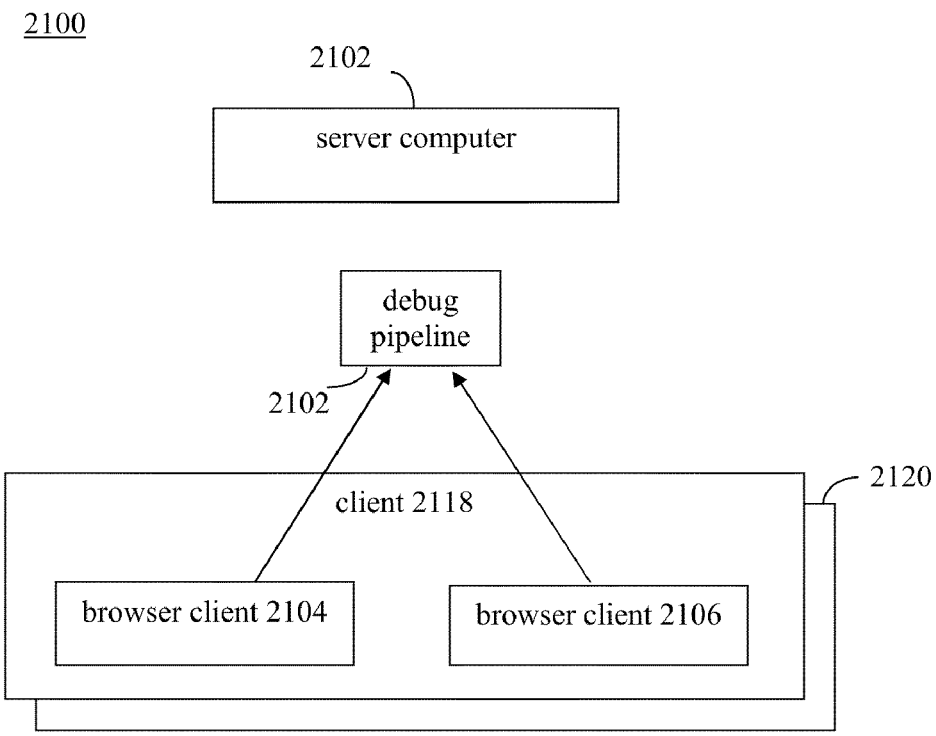

FIGS. 21A and 21B illustrate a block diagram of an example system for client-to-client low privilege debugging, according to an example embodiment.

Figure 22:
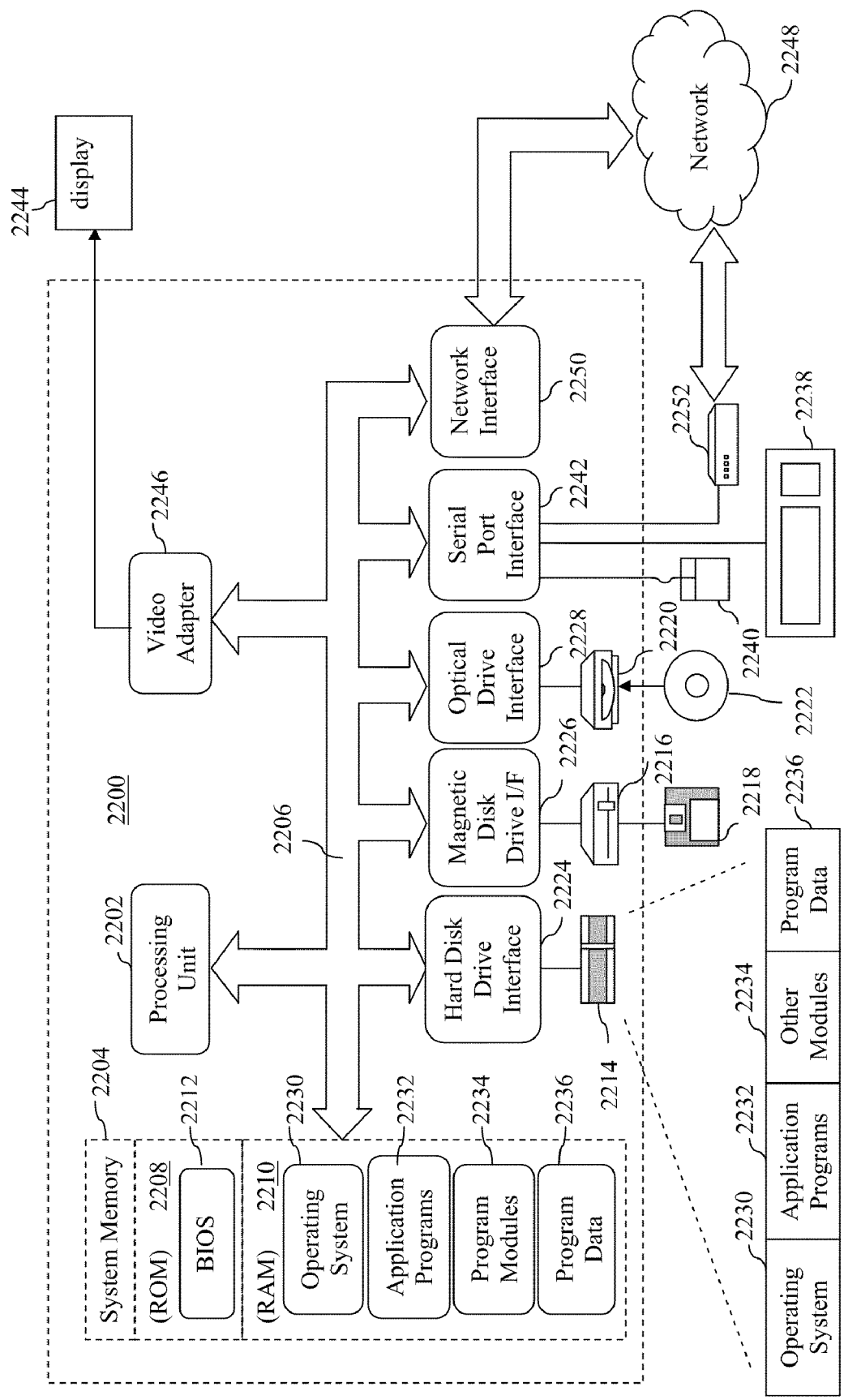

FIG. 22 shows a block diagram of an example computer that may be used to implement embodiments of the present invention of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Debuggers and Privilege

Many modern processor architectures have CPU modes that allow operating systems to run at different privilege levels. For instance, processes, resources and instructions which access resources are tagged with a privilege level. When a process tries to use a resource or attempts to execute a privileged instruction, the processor determines whether or not the process has permission to do so, and either permits or denies the operation. This prevents user processes from damaging the operating system or other processes running on the machine. Various numbers of levels of privilege may exist. For example, some processors support two levels of privilege, such as user (low privilege) and supervisor (high privilege). Other processors have four levels, with level #0 having the most privileges (high privilege) and level #3 having the least privileges (level #2 and level #3 may be considered low privilege).

A debugger is a tool which enables a programmer to monitor the execution of a program. In general, a debugger process is a high privilege process and a debuggee (the program being debugged or the debug target) is typically a low privilege process. When debugging locally, (e.g., a user is debugging a program on his own computer) it typically does not matter which of the two (debugger or debuggee) is more privileged because all the information on the computer typically belongs to the same user. Remote debugging (debugging a program running on a system accessible through a network connection) is more problematic. Remote debugging is typically performed in a client-server environment (e.g., where a client-server relationship exists).

A client-server relationship is a relationship between two computer programs running on two different computers in which one program, the client, makes a service request of another program, the server. Typical networked functions such as email exchange, web access and database access, are based on the client-server model. The term "server" in general usage refers both to the process running on the computer that services requests and to the actual computer on which the service runs. A server is typically dedicated to providing one or more services over a computer network, typically through a request-response protocol. A service is typically furnished by a server application designed to handle multiple concurrent requests. Examples of server applications include mail servers, file servers, web servers, and proxy servers. A server is typically high privilege so that it can service requests and access the information it needs to access to service the requests.

A client is an application or computer that accesses a remote service on a server via a network. The client-server model is widely used on the Internet, where a user may connect to a service operating on a remote system through the internet protocol suite. A web browser is a client program (or process, i.e., a program that is executing is a process) at the user computer that can access information at any web server in the network and retrieve web pages for display on the user computer. Such a client is typically low privilege to protect confidential, privileged or sensitive information and for tamper-protection purposes.

For instance, in some cases, it may be desirable to use a browser based application running at a client computer to debug a server application. However, a browser based application running at a client computer typically does not have sufficient privilege to debug applications at the server. The privilege level of the client-based application is kept low relative to the server so that the client-based application cannot damage the operating system or other processes running on the server. To raise the privilege level of the client-based browser based application to a sufficient level to debug the server-based application, enabling software must typically be installed at the client computer. For example, a debug DLL (dynamic link library), or other form of debut API (application programming interface) configured to raise the privilege of the client computer-based application, may need to be installed at the client computer.

Embodiments of the present invention overcome deficiencies of conventional techniques for debugging applications in client-server environments. Examples of such embodiments are described in the following sections.

III. Example Low Privilege Debugging Embodiments

The example embodiments described herein are provided for illustrative purposes, and are not limiting. Furthermore, additional structural and operational embodiments, including modifications/alterations, will become apparent to persons skilled in the relevant art(s) from the teachings herein.

Embodiments of the present invention relate to the debugging of applications. In embodiments, a debugger application running at a client computer is enabled to debug a server-based application without elevating the privilege level of the browser based application running at the client computer. Because the privilege level of the debugger application need not be raised, security issues at the server are avoided. In an embodiment, a bidirectional communication channel is established between the debugger application and the debuggee application. Debug-related messages are enabled to be transmitted between the debugger and debuggee applications through the bidirectional communication channel. In an embodiment, the messages arrive unmodified and in the same sequence sent by the particular sender (either the debugger or debuggee application). In an embodiment, the debuggee application is configured to be able to block its own thread of execution while waiting for debug requests from the debugger application.

In embodiments, various protocols may be used by the debugger and debuggee applications to communicate through the bidirectional communication channel. For example, in an embodiment, the bidirectional communication channel may be configured according to HTTP (hypertext transfer protocol). In this manner, standard web security mechanisms may be used by the communications.

Figure 1:
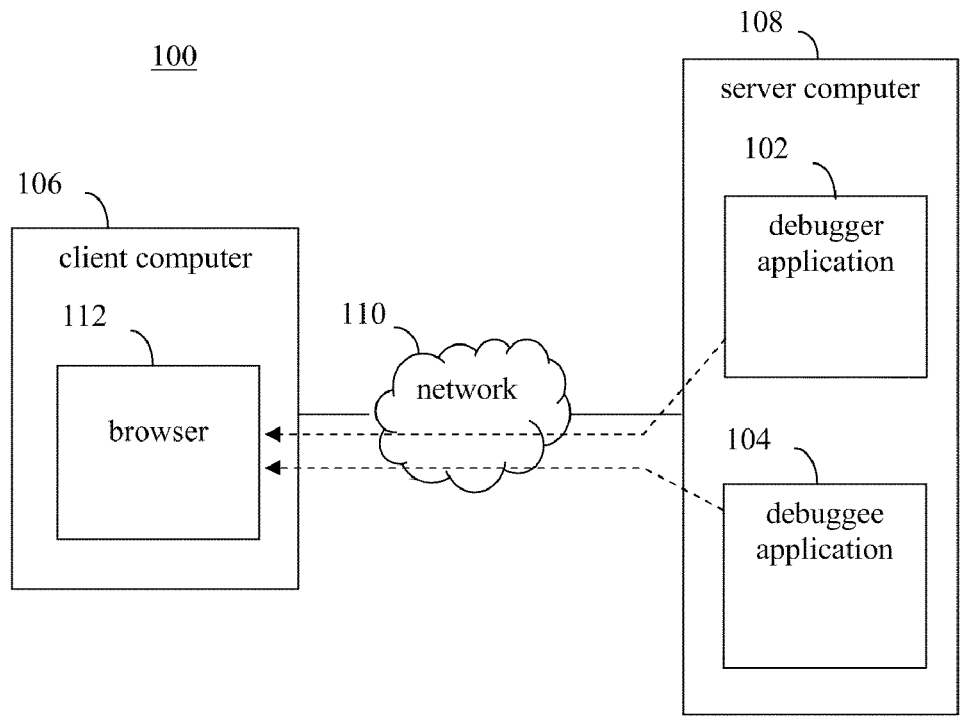
FIG. 1 shows a block diagram of an example client-server communication system in which an embodiment of the present invention may be implemented.

FIG. 1 shows a block diagram of an example client-server communication system 100 in which embodiments may be implemented. As shown in FIG. 1, system 100 includes a client computer 106, a server computer 108, and a network 110. System 100 is described as follows.

Client computer 106 and server computer 108 may each be any suitable type of computing device described herein or otherwise known, including a desktop computer, a mobile computer or computing device, or other type of computer. Network 110 is configured to communicatively couple client computer 106 and server computer 108. Network 110 may include one or more communication links and/or communication networks, wired and/or wireless, such as a PAN (personal area network), a LAN (local area network), a WAN (wide area network), or a combination of networks, such as the Internet, and may include one or more telecommunications networks, wired or wireless, such as a GSM (Global System for Mobile communications) network, a 3G network, and/or further networks.

Server computer 108 includes (e.g., stores in memory and/or associated storage) a debugger application 102 and a debuggee application 104. Debugger application 102 includes debug capability, and may include further capabilities. For example, debugger application 102 is configured to be capable of debugging debuggee application 104. Debugger and debuggee applications 102 and 104 may be the same type of application or process or may be different types of applications or processes. As shown in FIG. 1, client computer 106 is configured to execute a browser 112. In an embodiment, debugger and debuggee applications 102 and 104 may be browser based applications that are capable of being loaded and run by a browser, such as browser 112. For example, debugger and debuggee applications 102 and 104 may be executed directly by browser 112 and/or by a "plug-in" or "add-in" to browser 112. Examples of such plug-ins include Silverlight™, published by Microsoft Corporation of Redmond, Wash., Javascript™ plug-ins (Javascript™ is published by Sun Microsystems, Inc., of Santa Clara, Calif.), Adobe Flash Player developed by Adobe Systems Inc. of San Jose, Calif., and further plug-ins. Thus, debugger and debuggee applications 102 and 104 may be Silverlight™ processes, Javascript™ processes, Flash processes (e.g., .SWF files), and further applications/scripts. Browser 112 may be any type of web browser, including Microsoft Internet Explorer®, Google Chrome, Mozilla Firefox, etc.

As indicated by dotted line in FIG. 1, browser 112 may load debugger application 102. For example, browser 112 may navigate (e.g., by user interaction with browser 112) to a web page served by server computer 108 that includes debugger application 102. As a result, debugger application 102 is downloaded to client computer 106. At client computer 106, a user may interact with debugger application 102 (e.g., through browser 112) to debug debuggee application 104. According to an embodiment, a bidirectional communication channel is established between debugger application 102 and debuggee application 104 through which debugger application 102 is enabled to debug debuggee application 104.

Figure 2:
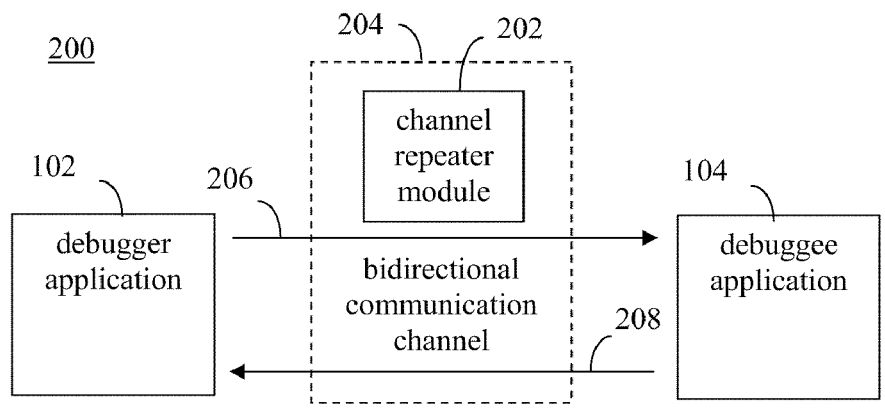
FIG. 2 shows a block diagram of debug system, according to an example embodiment of the present invention.

For instance, FIG. 2 shows a block diagram of a debug system 200, according to an example embodiment. As shown in FIG. 2, system 200 includes debugger application 102, debuggee application 104, a channel repeater module 202, and a bidirectional communication channel 204. As shown in FIG. 2, debugger application 102 transmits debug-related messages 206 to debuggee application 104 through bidirectional communication channel 204, and debuggee application 104 transmits debug-related messages 208 to debugger application 102 through bidirectional communication channel 204. In an embodiment, debug-related messages 206 and 208 arrive at debuggee application 104 and debugger application 102, respectively, in an unmodified form and in the same sequence as they were transmitted. In an embodiment, messages 206 and 208 between debugger application 102 and debuggee application 104 flow through channel repeater module 202 in bidirectional communication channel 204. Channel repeater module 202 enables debugger application 102 to debug debuggee application 104 through bidirectional communication channel 204 without the need to elevate the privilege level of debugger application 102.

Figure 3:
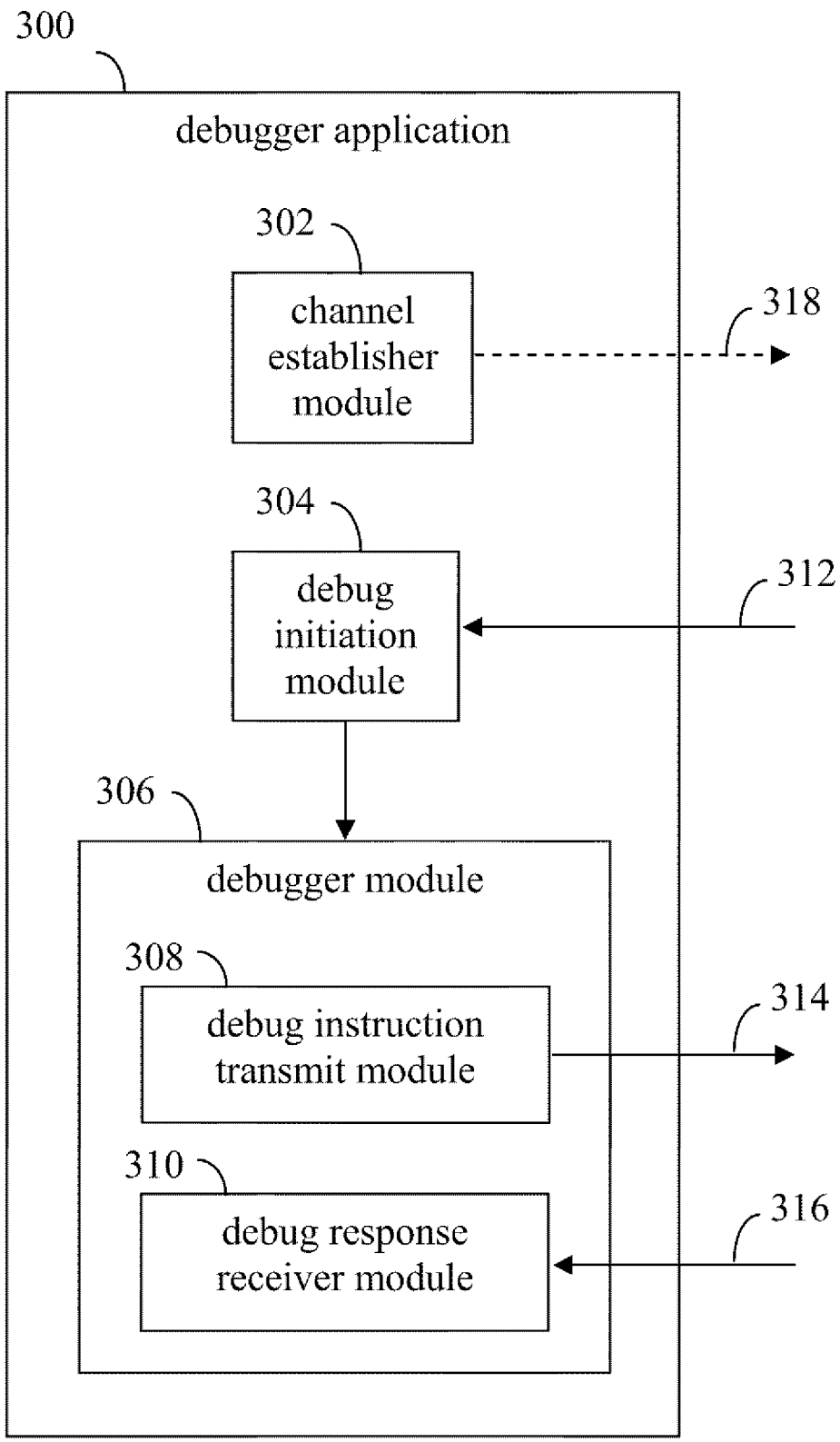
FIG. 3 shows a block diagram of a debugger application, according to an example embodiment.
Figure 4:
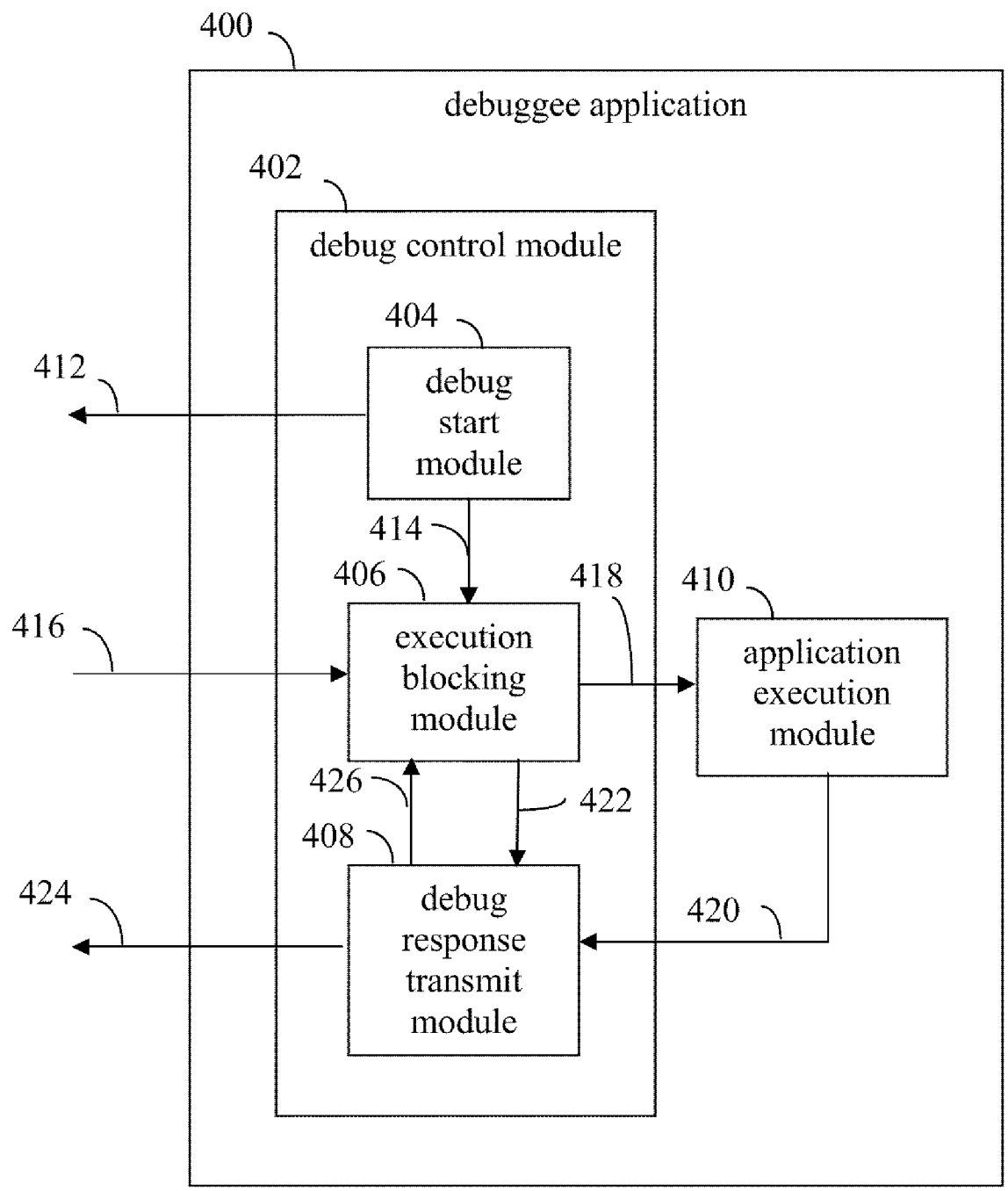
FIG. 4 shows a block diagram of a debuggee application, according to an example embodiment.

Debugger application 102 and debuggee application 104 may be configured in various ways to enable debugging through bidirectional communication channel 204. For instance, FIG. 3 shows a block diagram of a debugger application 300, according to an example embodiment. Furthermore, FIG. 4 shows a block diagram of a debuggee application 400, according to an example embodiment. Debugger application 300 is an example of debugger application 102, and debuggee application 400 is an example of debuggee application 104. Debugger application 300 and debuggee application 400 are described as follows.

As shown in FIG. 3, debugger application 300 includes a channel establisher module 302, a debug initiation module 304, and a debugger module 306. In the example of FIG. 3, debugger module 306 includes a debug instruction transmit module 308 and a debug response receiver module 310.

Channel establisher module 302 is configured to invoke channel repeater module 202 to establish bidirectional communication channel 204 between debugger application 102 and debuggee application 104. Debug initiation module 304 is configured to receive a start indication 312 from debuggee application 400 of FIG. 4 through channel repeater module 202. Debugger module 306 is configured to perform one or more debug operations on debuggee application 400. Debug instruction transmit module 308 is configured to transmit a debug request message 314 to debuggee application 400 through channel repeater module 202. Debug response receiver module 310 is configured to receive a debug performed message 316 as a response to debug request message 314 from debuggee application 400 through channel repeater module 202.

As shown in FIG. 4, debuggee application 400 includes a debug control module 402 and an application execution module 410. Debug control module 402 is configured to conduct debugging of debuggee application 400, as controlled by communications from debugger application 400 through channel repeater module 202. Application execution module 410 enables execution of application code of debuggee application 400 as controlled by debug control module 402. In the example of FIG. 4, debug control module 402 includes a debug start module 404, an execution blocking module 406, and a debug response transmit module 408. Debug start module 404 is configured to enable debugging of debuggee application 400. For example, as shown in FIG. 4, debug start module 404 generates a start indication 412 to indicate that debugging of debuggee application 400 may proceed. Start indication 412 is received by debug initiation module 304 in FIG. 3 through channel repeater module 202 as start indication 312.

As shown in FIG. 4, execution blocking module 406 receives a block signal 414 from debug start module 404. Debug start module 404 generates block signal 414 upon transmitting start indication 412. Execution blocking module 406 maintains a state for debuggee application 104, and is configured to enter a blocked wait state upon receiving block signal 414. Furthermore, execution blocking module 406 generates an execution enable/disable signal 418, which is received by application execution module 410. In a blocked wait state for execution blocking module 406, execution enable/disable signal 418 is generated to cause execution of code of debuggee application 400 in application execution module 410 to be disabled (i.e., halted or blocked).

As further shown in FIG. 4, execution blocking module 406 may receive a debug request message 416 from channel repeater module 202, which is debug request message 314 received by channel repeater module 202. Debug request message 416 indicates one or more debug actions/operations to be performed on the code of debuggee application 400. Upon receiving debug request message 416, execution block module 406 transitions to a run state, and generates execution enable/disable signal 418 to cause execution of code of debuggee application 400 in application execution module 410 to be enabled (e.g., a value of execution enable/disable signal 418 is toggled or changed relative to a value configured to disable application execution module 410). Thus, execution of code of debuggee application 400 by application execution module 410 may proceed. As shown in FIG. 4, application execution module 410 generates an execution output 420, which is received by debug response transmit module 408. Execution output 420 indicates a current point of execution in the code being executed by application execution module 410, one or more variable values, and/or further information of interest with regard to the execution of the code of debuggee application 104.

Furthermore, execution blocking module 406 generates a debug instruction 422. Debug instruction 422 is a debug instruction extracted from debug request message 416 (from debug request message 314 of FIG. 3). Debug instruction 422 may include one or more of a variety of debug operation instructions to be performed on the code of debuggee application 400, including an instruction to set a breakpoint and run, to set a breakpoint and step, etc. Debug instruction 422 is received by debug response transmit module 408. Debug response transmit module 408 monitors execution output 420, and determines when debug instruction 422 is fulfilled, such as a breakpoint being reached, a step being completed, etc. When debug response transmit module 408 determines that debug instruction 422 is fulfilled, debug response transmit module 408 generates a block signal 426, which is received by execution blocking module 406. Execution blocking module 406 is configured to transition to a blocked wait state upon receiving block signal 426, and generates execution enable/disable signal 418 to cause execution of code of debuggee application 400 in application execution module 410 to be disabled. Furthermore, when debug response transmit module 408 determines that debug instruction 422 is fulfilled, debug response transmit module 408 generates a debug performed message 424. Debug performed message 424 is transmitted to channel repeater module 202, which transmits debug performed message 424 to debug response receiver module 310 as debug performed message 316. Debug performed message 424 indicates that the debug request message 314 has been completed, and may optionally include further information, including information of execution output 420.

Referring back to FIG. 2, debugger application 102 may perform debugging of debuggee application 104 in various ways. For instance, FIG. 5 shows a flowchart 500 providing a process for a debugger application to perform debugging of debuggee application 104, according to an example embodiment. For example, flowchart 500 may be performed by debugger application 102 and by debugger application 300 of FIG. 3. Other structural and operational embodiments will be apparent to persons skilled in the relevant art(s) based on the discussion regarding flowchart 500. Flowchart 500 is described in the following subsections.

A. Example Embodiments for Establishing a Bidirectional Communication Channel

As shown in FIG. 5, flowchart 500 begins with step 502. In step 502, a channel repeater module is invoked to establish a bidirectional communication channel between the first browser based application and a second browser based application. Referring to FIG. 2, for example, channel repeater module 202 may be invoked to establish bidirectional communication channel 204 between debugger application 102 (the first browser based application) and debuggee application 104 (the second browser based application). For example, in an embodiment, channel repeater module 202 may be invoked by channel establisher module 302 shown in FIG. 3. When channel repeater module 202 is invoked, channel repeater module 202 becomes enabled to receive messages from debugger application 102 and transmit them to debuggee application 104, and to receive messages from debuggee application 104 and transmit them to debugger application 102. Debugger and debuggee applications 102 and 104 are enabled to communicate using a communication protocol enabled by a browser in which they are loaded, such as browser 112 shown in FIG. 1. For example, the communication protocol may be enabled by the browser directly (e.g., HTTP) and/or by an add-on/plug-in to the browser. This enables debugger and debuggee applications 102 and 104 to communicate through the bidirectional communication channel to debug debuggee application 104, without an elevation of privilege.

In one embodiment, channel repeater module 202 may be included in debugger application 300. In such an embodiment, channel establisher module 302 may invoke channel repeater module 202 in debugger application 300 when debugging of an application is to be performed. In another embodiment, channel repeater module 202 may external to debugger application 300, such as being included in a same computer system or a different computer system than a computer system in which debugger application 300 is included. In such an embodiment, channel establisher module 302 may invoke channel repeater module 202 by transmitting a channel invocation signal 318 (shown in FIG. 3) to channel repeater module 202 when debugging of an application is to be performed.

Figure 6:
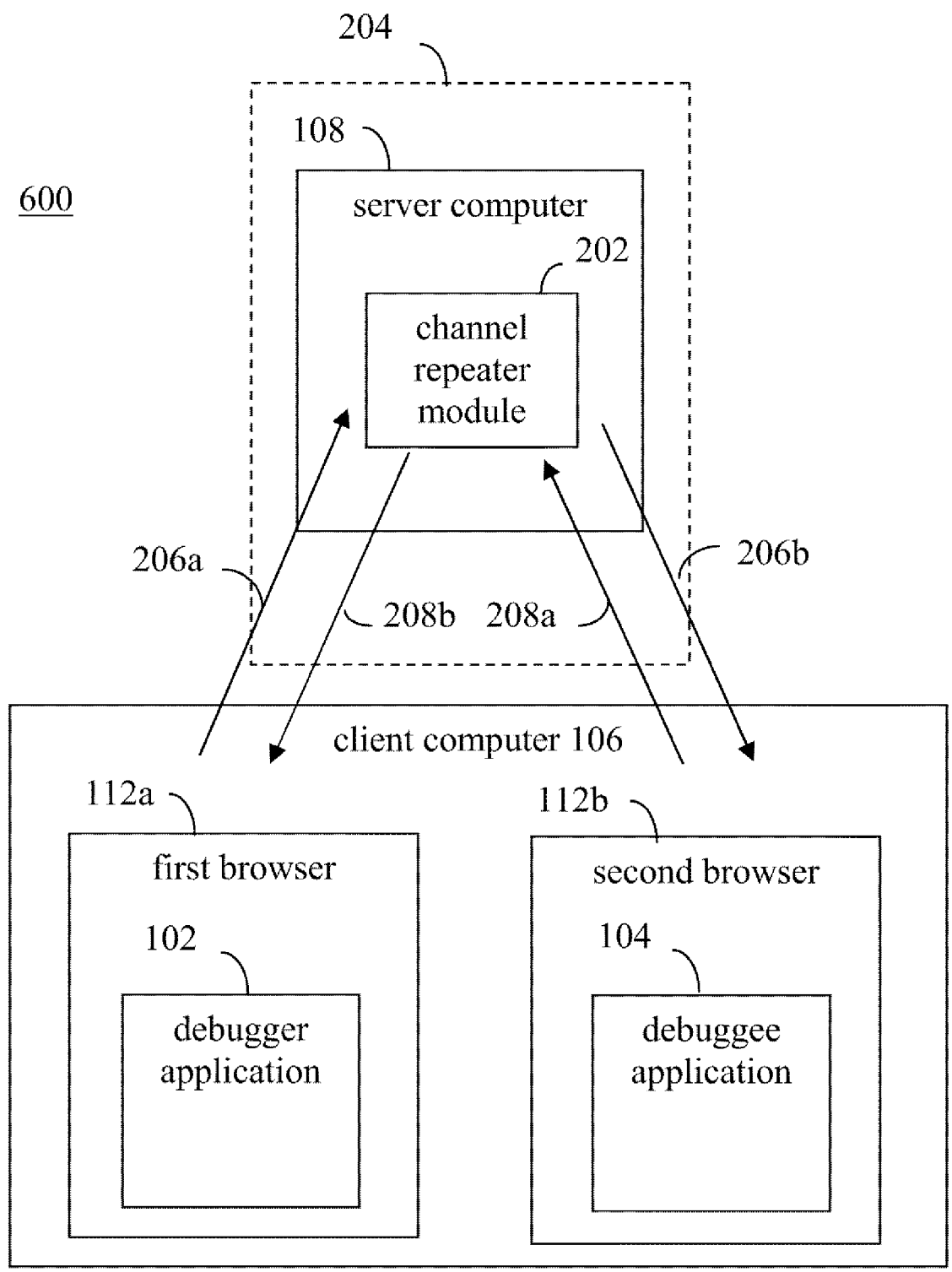
FIGS. 6 and 7 show block diagrams of debug systems, according to example embodiments.

For instance, FIG. 6 shows a block diagram of a debug system 600, according to an example embodiment. Debug system 600 is an example of debug system 200 shown in FIG. 2. As shown in FIG. 6, system 600 includes debugger application 102, debuggee application 104, channel repeater module 202, bidirectional communication channel 204, a first browser 112a, a second browser 112b, and server computer 108. In FIG. 6, first browser 112a runs and provides a user interface for debugger application 102, and second browser 112 runs and provides a user interface for debuggee application 104. First browser 112a and second browser 112b may be included in a same browser (e.g., being separate windows or tabs of browser 112 in FIG. 1), or may be separate browser invocations. In the embodiment of FIG. 6, channel repeater module 202 is included in server computer 108. Thus, as described above, channel establisher module 302 shown in FIG. 3 may invoke channel repeater module 202 by transmitting a channel invocation signal 318 to channel repeater module 202 at server computer 108 when debugging of an application is to be performed.

As shown in FIG. 6, debugger application 102 transmits debug-related messages 206 to debuggee application 104 through channel repeater module 202 at server computer 108 (e.g., through network 110 shown in FIG. 1). For instance, debugger application 102 transmits a debug-related message 206a (e.g., message 314 of FIG. 3) to channel repeater module 202 at server computer 108, which transmits the same message as debug-related message 206b (e.g., message 416 of FIG. 4) to debuggee application 104. Furthermore, debuggee application 104 transmits debug-related messages 208 to debugger application 102 through channel repeater module 202 at server computer 108. For instance, debuggee application 104 transmits a debug-related message 208a (e.g., start indication 412 or message 424 of FIG. 4) to channel repeater module 202 at server computer 108, which transmits the same message as debug-related message 208b (e.g., start indication 312 or message 316 of FIG. 3) to debugger application 102.

Figure 7:
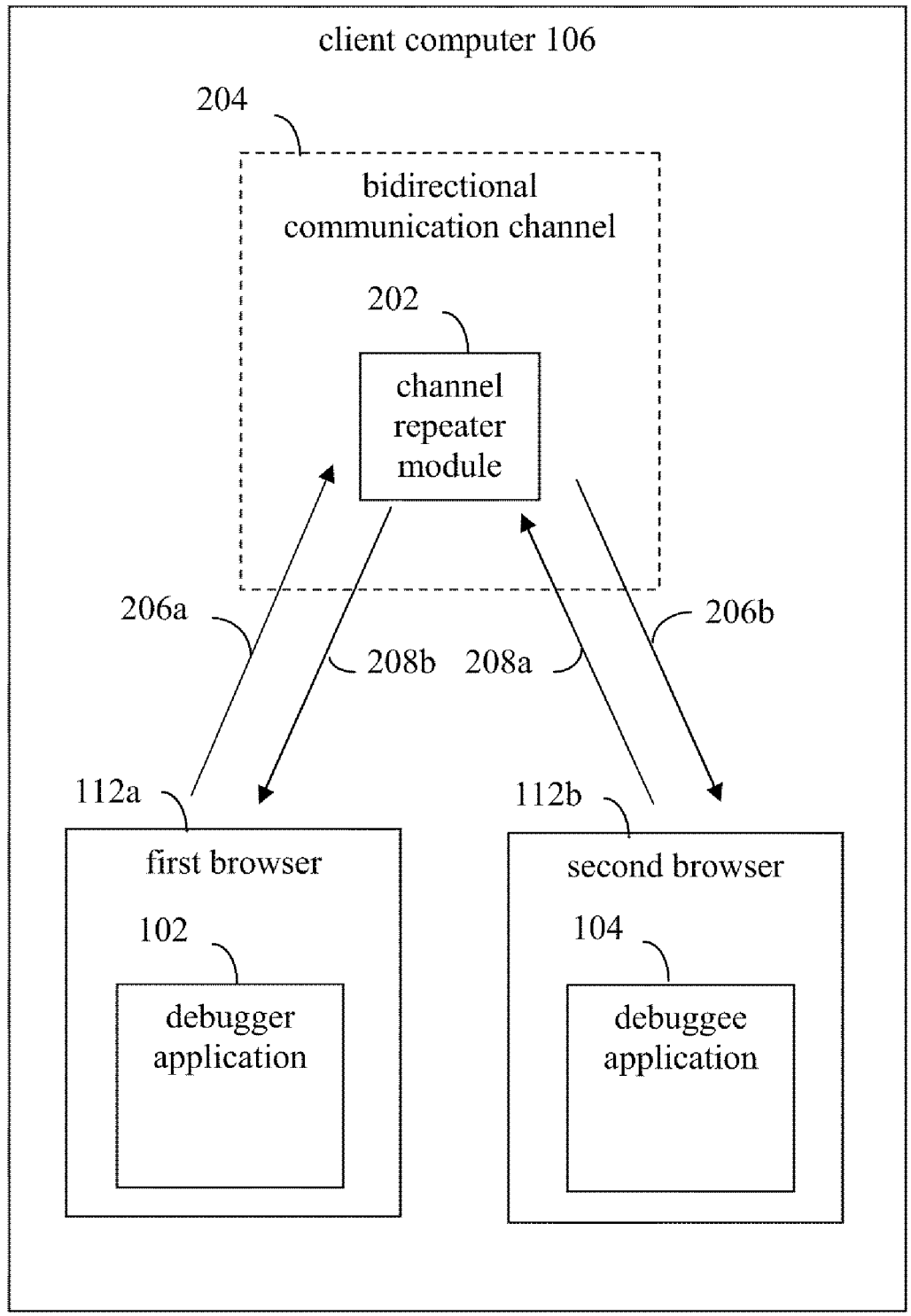

FIG. 7 shows a block diagram of a debug system 700, according to an example embodiment. Debug system 700 is another example of debug system 200 shown in FIG. 2. As shown in FIG. 7, system 700 includes debugger application 102, debuggee application 104, channel repeater module 202, bidirectional communication channel 204, a first browser 112a, a second browser 112b, and server computer 108. In the embodiment of FIG. 7, channel repeater module 202 and bidirectional communication channel 204 are included in client computer 106. Channel establisher module 302 shown in FIG. 3 may invoke channel repeater module 202 in client computer 106 when debugging of an application is to be performed. As described, although not shown in FIG. 6, channel repeater module 202 may be included in debugger application 102.

As shown in FIG. 7, debugger application 102 transmits debug-related messages 206 to debuggee application 104 through channel repeater module 202 in client computer 106. For instance, debugger application 102 transmits debug-related message 206a (e.g., message 314 of FIG. 3) to channel repeater module 202 in client computer 106, which transmits debug-related message 206b (e.g., message 416 of FIG. 4) to debuggee application 104. Furthermore, debuggee application 104 transmits debug-related messages 208 to debugger application 102 through channel repeater module 202 client computer 106. For instance, debuggee application 104 transmits debug-related message 208a (e.g., start indication 412 or message 424 of FIG. 4) to channel repeater module 202 in client computer 106, which transmits debug-related message 208b (e.g., start indication 312 or message 316 of FIG. 3) to debugger application 102.

B. Example Embodiments for Initiating Debugging

Example embodiments for the initiation of debugging are described in this subsection. Debugging of debuggee application 104 may be initiated in various ways. Referring back to FIG. 5, in step 504 of flowchart 500, a start indication is received from the second browser based application through the channel repeater module. Referring to FIG. 2, for example, debuggee application 104 may transmit a start indication to debugger application 102 through channel repeater module 202 to initiate debugging of debuggee application 104.

Figure 8:
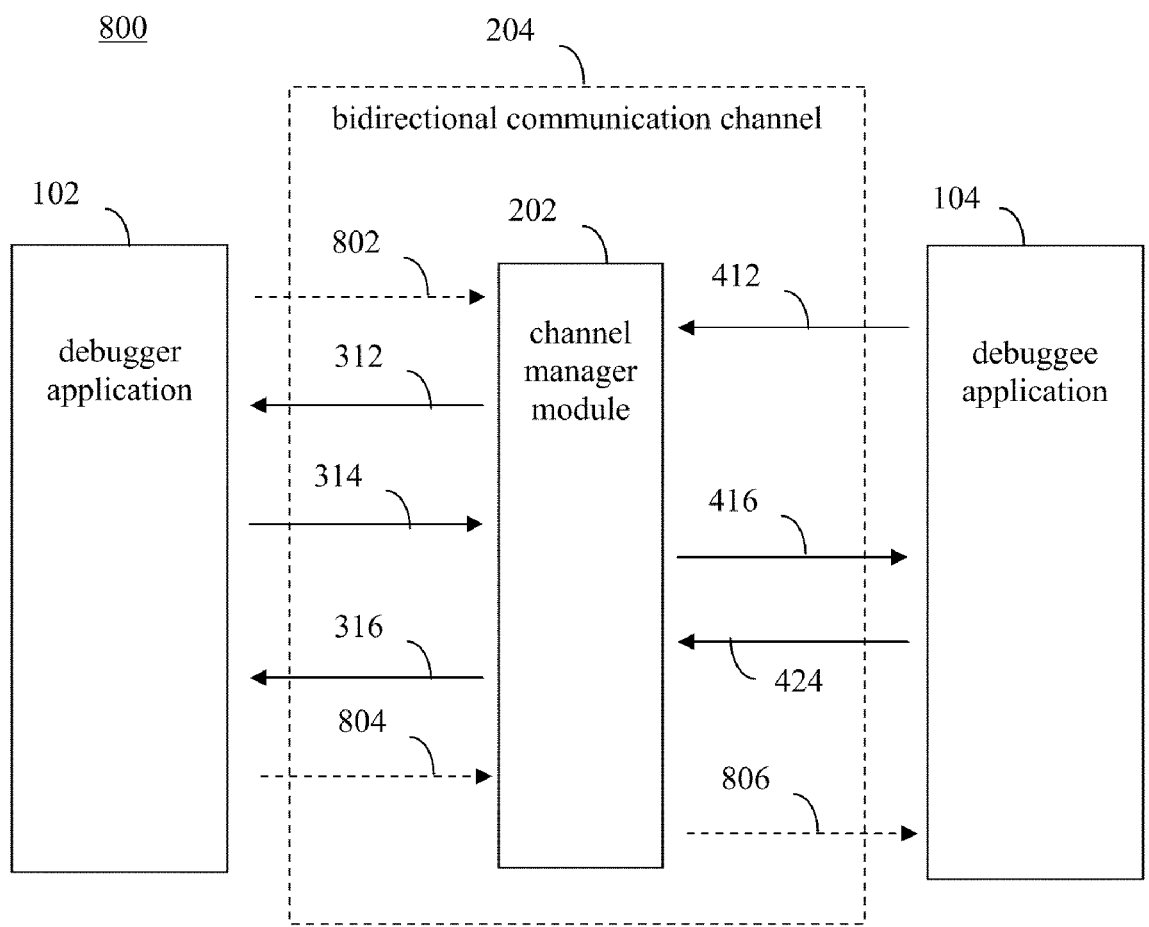
FIG. 8 shows a block diagram of a debug system, according to an example embodiment.
Figure 9:
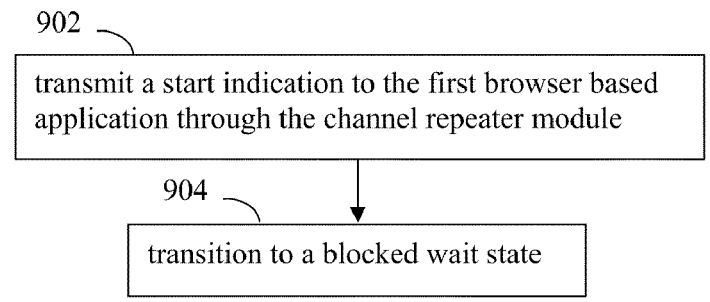
Figure 10:
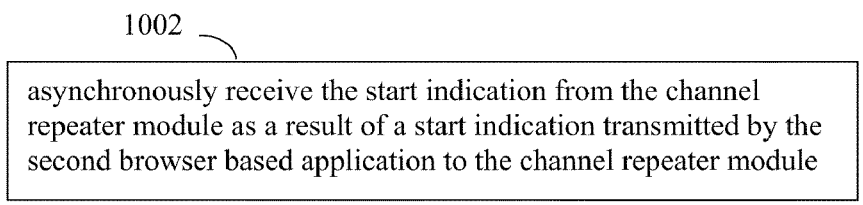
Figure 11:
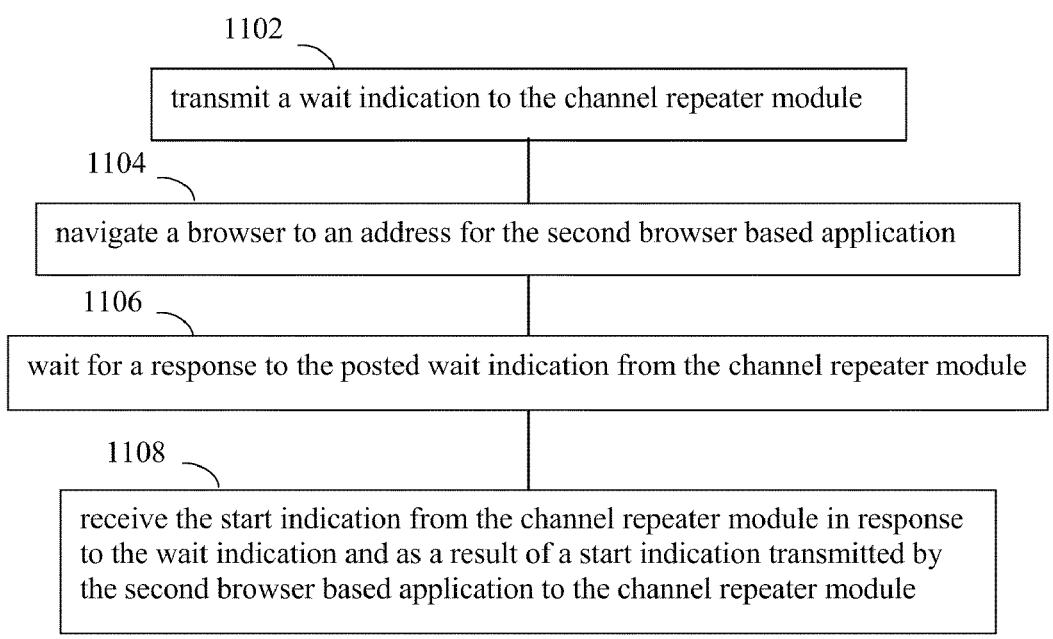
Figure 12:
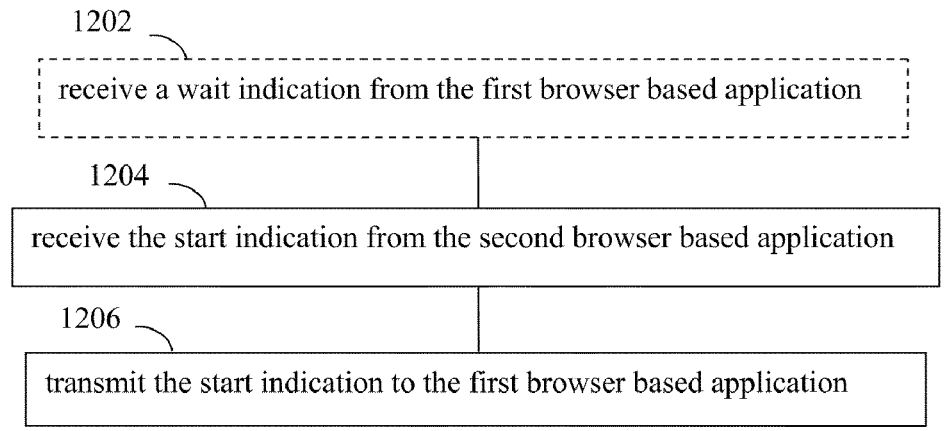

FIG. 8 shows a block diagram of a debug system 800, according to an example embodiment. FIG. 8 is referred to in this section to illustrate example embodiments for initiating debugging of debuggee application 104. Debug system 800 is similar to debug system 200 shown in FIG. 2, and further illustrates example communications between debugger application 102 and debuggee application 104 through channel manager module 202 in bidirectional communication channel 204. FIG. 8 is described with respect to FIGS. 9-12, which show respective flowcharts for initiating debugging of debuggee application 104, according to example embodiments. FIG. 9 shows a flowchart 900 of a process in a debuggee application for initiating debugging. FIGS. 10 and 11 show respective flowcharts 1000 and 1100 for a debugger application during initiation of debugging. FIG. 12 shows a flowchart 1200 for a channel repeater module during initiation of debugging. Other structural and operational embodiments will be apparent to persons skilled in the relevant art(s) based on the discussion regarding flowcharts 900, 1000, 1100, 1200, and system 800 of FIG. 8.

As shown in FIG. 9, flowchart 900 begins with step 902. In step 902, a start indication is transmitted to the first browser based application through the channel repeater module. For example, referring to FIG. 8, debuggee application 104 may transmit start indication 412 to channel manager module 202, and channel manager module 202 may transmit start indication 412 to debugger application 102 as start indication 312. As described above with respect to FIG. 4, debug start module 404 may generate start indication 412, and as shown in FIG. 3, debug initiation module 304 may receive start indication 312.

In step 904, the second browser based application transitions to a blocked wait state. For example, upon transmitting start indication 412, debuggee application 104 may transition to a blocked wait state. For instance, as described above with respect to FIG. 4, execution blocking module 406 may generate execution enable/disable signal 418 to cause execution of code of debuggee application 400 in application execution module 410 to be disabled (i.e., halted or blocked). In this manner, execution of code of debuggee application 104 may be blocked, even prior to a first code line of debuggee application 104.

With regard to debugger application 102, initiation of debugging of debuggee application 104 may be performed in various ways. Flowcharts 1000 and 1100 (FIGS. 10 and 11) show example embodiments for initiating debugging of debuggee application 104 in debugger application 102. For example, as shown in FIG. 10, flowchart 1000 includes step 1002. In step 1002, the start indication is asynchronously received from the channel repeater module as a result of a start indication transmitted by the second browser based application to the channel repeater module. For example, referring to FIG. 8, start indication 312 may be asynchronously received from channel manager module 202. In such an embodiment, debugger application 102 need not necessarily wait or provide an indication that debugger application 102 is waiting for start indication 312.

In the embodiment of FIG. 11, flowchart 1100 begins with step 1102. In step 1102, a wait indication is transmitted to the channel repeater module. For example, as shown in FIG. 8, debugger application 102 may transmit a wait indication 802 to channel manager module 202. For instance, referring to FIG. 3, debug initiation module 304 may be configured to transmit wait indication 802.

In step 1104, a browser navigates to an address for the second browser based application. For example, as described above, debugger application 102 may have previously been invoked, such as by navigating browser 112 to a web page at server computer 108 that includes debugger application 102. In step 1104, browser 112 may navigate to the address (e.g., uniform resource locator (URL) of a web page) for debuggee application 104 at server computer 108. In this manner, debuggee application 104 is loaded for debugging by debugger application 102.

In step 1106, a response to the posted wait indication from the channel repeater module is waited for. For example, referring to FIG. 8, after transmitting wait indication 802, debugger application 102 may be configured to wait for start indication 312 to be received. Step 1106 is optional, and in other embodiments, debugger application 102 may not necessarily wait for start indication 312 (e.g., debugger application 102 may perform other functions in the meantime).

In step 1108, the start indication is received from the channel repeater module in response to the wait indication and as a result of a start indication transmitted by the second browser based application to the channel repeater module. For example, referring to FIG. 8, start indication 312 may be received from channel manager module 202 in response to wait indication 802 being transmitted to channel repeater module 202.

As described above, channel repeater module 202 performs a repeater function for signals transmitted by debugger application 102 and debuggee application 104. Referring to FIG. 12, flowchart 1200 begins with step 1202. In step 1202, a wait indication is received from the first browser based application. For instance, as shown in FIG. 8, wait indication 802 is received by channel repeater module 202 from debugger application 102. Step 1202 is optional.

In step 1204, the start indication is received from the second browser based application. For example, as shown in FIG. 8, start indication 412 is received by channel repeater module 202 from debuggee application 104.

In step 1206, the start indication is transmitted to the first browser based application. For example, as shown in FIG. 8, start indication 412 is transmitted by channel repeater module 202 to debugger application 102 as start indication 312.

C. Example Embodiments for Performing Debugging

Example embodiments for the performance of debugging are described in this subsection. Referring back to FIG. 5, in step 506 of flowchart 500, a debug operation is performed on the second browser based application. Referring to FIG. 2, for example, debugger application 102 may perform one or more debug operations on debuggee application 104 through channel repeater module 202.

Figure 13:
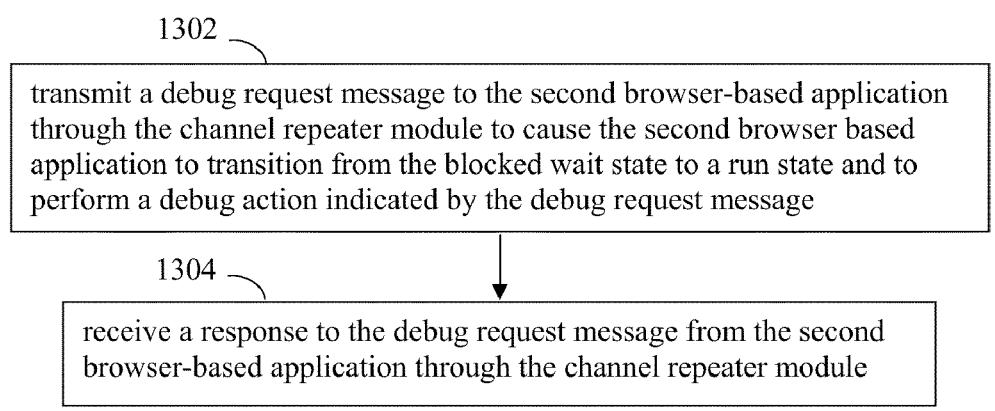
Figure 14:
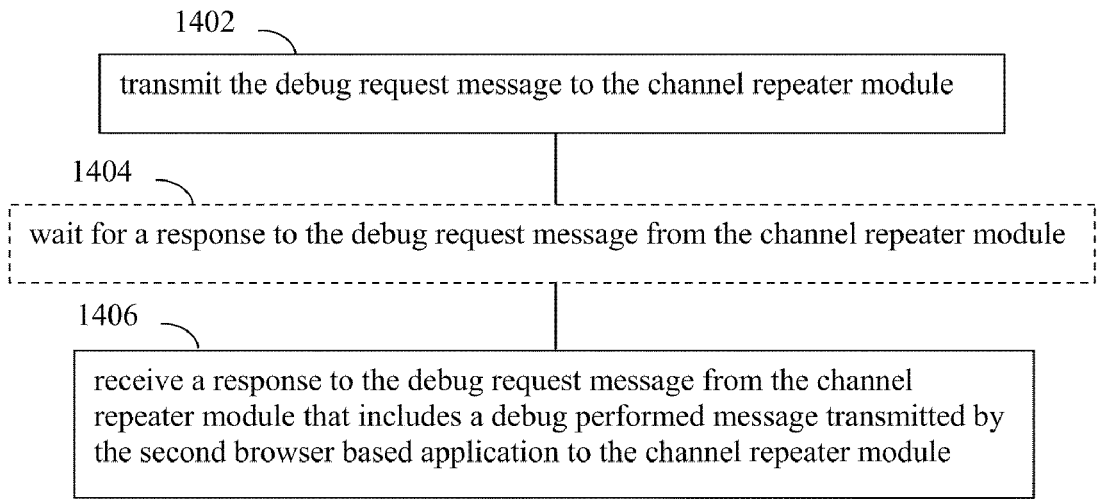
Figure 15:
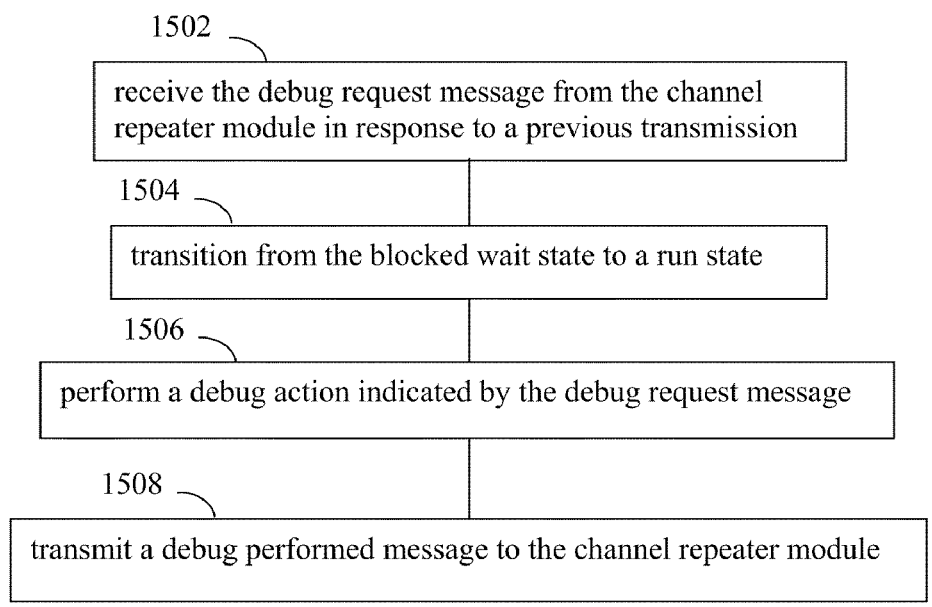
Figure 16:
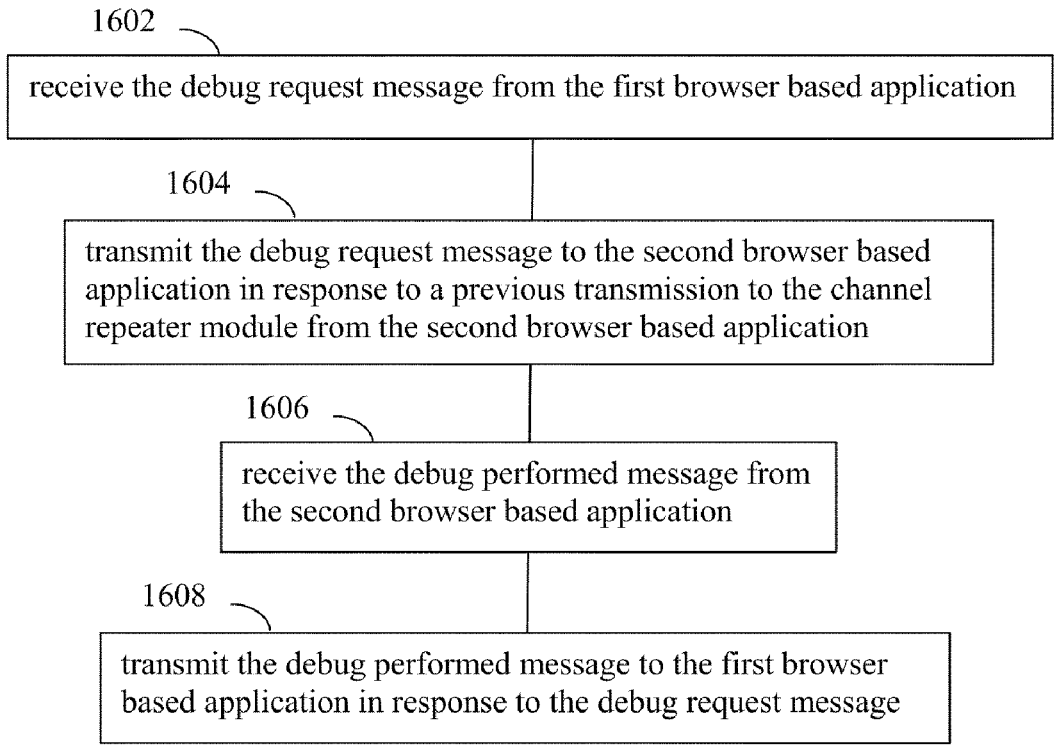

Debugging of debuggee application 104 by debugger application 102 may be performed in various ways. For instance, FIGS. 13-16 show flowcharts for performing debugging, according to example embodiments. FIGS. 13 and 14 show flowcharts 1300 and 1400 for processes performed in a debugger application for debugging. FIG. 15 shows a flowchart 1500 for a debuggee application during debugging. FIG. 16 shows a flowchart 1600 for a channel repeater module during performance of debugging. Flowcharts 1300, 1400, 1500, and 1600 are described with respect to debug system 800 shown in FIG. 8, for purposes of illustration. Other structural and operational embodiments will be apparent to persons skilled in the relevant art(s) based on the discussion regarding flowcharts 1300, 1400, 1500, and 1600, and system 800 of FIG. 8.

As shown in FIG. 13, flowchart 1300 begins with step 1302. In step 1302, a debug request message is transmitted to the second browser-based application through the channel repeater module to cause the second browser based application to transition from the blocked wait state to a run state and to perform a debug action indicated by the debug request message. For example, as shown in FIG. 8, debugger application 102 may transmit debug request message 314 to channel manager module 202. For instance, referring to FIG. 3, debug instruction transmit module 308 may be configured to transmit debug request message 314. Debug request message 314 may include one or more debug operations, as described elsewhere herein, to be performed on debuggee application 104.

In step 1304, a response to the debug request message is received from the second browser-based application through the channel repeater module. For example, referring to FIG. 8, debug performed message 316 is received by debugger application 102 as a response to debug request message 314 from debuggee application 104 through channel repeater module 202. Referring to FIG. 3, debug response receiver module 310 may be configured to receive debug performed message 316. Upon receiving debug performed message 316, execution of code of debuggee application 104 is blocked. Thus, a user (e.g., interacting with browser 112) may be enabled to perform debug analysis of debuggee application 104 at its current execution state.

Debugger application 102 may optionally wait for the response to debug request message 314. For example, in such an embodiment, debugger application 102 may perform flowchart 1300 of FIG. 13 according to flowchart 1400 shown in FIG. 14. As shown in FIG. 14, flowchart 1400 begins with step 1402. In step 1402, the debug request message is transmitted to the channel repeater module. For example, as shown in FIG. 8, debugger application 102 may transmit debug request message 314 to channel manager module 202.

In step 1404, a response to the debug request message from the channel repeater module is waited for. For example, referring to FIG. 8, after transmitting debug request message 314, debugger application 102 may be configured to wait for debug performed message 316 to be received. Step 1404 is optional, and in other embodiments, debugger application 102 may not necessarily wait for debug performed message 316 (e.g., debugger application 102 may perform other functions).

In step 1406, a response to the debug request message is received from the channel repeater module that includes a debug performed message transmitted by the second browser based application to the channel repeater module. For example, referring to FIG. 8, debug performed message 316 is received by debugger application 102 as a response to debug request message 314 from debuggee application 104 through channel repeater module 202.

With regard to debuggee application 104, debugging may be performed in various ways. For instance, as shown in FIG. 15, flowchart 1500 begins with step 1502. In step 1502, the debug request message is received from the channel repeater module in response to a previous transmission. For example, referring to FIG. 8, debug request message 314 transmitted to channel repeater module 202 is received by debuggee application 104 as debug request message 416. As described above with respect to FIG. 4, execution blocking module 406 may receive debug request message 416. In an embodiment, debug request message 416 is received by debuggee application 104 in response to a previous transmission to channel repeater module 202. For example, debug request message 416 may be received from channel repeater module 202 in response to debuggee application 104 transmitting start indication 412 to channel repeater module 202 (e.g., at initiation of debugging) or in response to transmitting a previous debug performed message 424 to channel repeater module 202 (e.g., during an immediately previous debug cycle).

In step 1504, the second browser based application transitions from the blocked wait state to a run state. For example, upon receiving debug request message 416, debuggee application 104 may transition from a blocked wait state to a run state. For instance, as described above with respect to FIG. 4, execution blocking module 406 may generate execution enable/disable signal 418 to cause execution of code of debuggee application 400 in application execution module 410 to be enabled.

In step 1506, a debug action indicated by the debug request message is performed. Debuggee application 104 performs a debug action indicated by debug request message 416. For example, as shown in FIG. 4, execution blocking module 406 generates a debug instruction 422. Debug instruction 422 is a debug instruction extracted from debug request message 416. Debug instruction 422 may include one or more of a variety of debug operation instructions to be performed on the code of debuggee application 400, including an instruction to set a breakpoint and run, to set a breakpoint and step, or other debug operation described herein or otherwise known.

In step 1508, a debug performed message is transmitted to the channel repeater module. For example, referring to FIG. 8, debug performed message 424 is transmitted to channel repeater module 202 by debuggee application 104. As described above with respect to FIG. 4, debug response transmit module 408 may generate debug performed message 424.

As described above, channel repeater module 202 performs a repeater function for signals transmitted by debugger application 102 and debuggee application 104. Referring to FIG. 16, flowchart 1600 begins with step 1602. In step 1602, the debug request message is received from the first browser based application. For instance, as shown in FIG. 8, debug request message 314 is received by channel repeater module 202 from debugger application 102.

In step 1604, the debug request message is transmitted to the second browser based application in response to a previous transmission to the channel repeater module from the second browser based application. For instance, as shown in FIG. 8, debug request message 314 is transmitted to debuggee application 104 from channel manager module 202 as debug request message 416. In an embodiment, as described above, debug request message 314 may be transmitted as a response to a previous transmission to channel repeater module 202 from debuggee application 104.

In step 1606, the debug performed message is received from the second browser based application. For instance, as shown in FIG. 8, debug performed message 424 is received at channel manager module 202 from debuggee application 104.

In step 1608, the debug performed message is transmitted to the first browser based application in response to the debug request message. For instance, as shown in FIG. 8, debug performed message 424 is transmitted to debugger application 102 from channel manager module 202 as debug performed message 424. In an embodiment, debug performed message 424 may be transmitted to debugger application 102 as a response to a previous transmission to channel repeater module 202 from debugger application 102, such as debug request message 314.

Note that as described above, debugging of debuggee application 104 by debugger application 102 through channel repeater module 202 may be performed in various ways. For instance, in one embodiment, debuggee application 104 may be debugged in a multi-threaded manner, where debug start module 404 executes in a first thread, and application execution module 410 executes in a second thread, and the first and second threads cooperate to perform debugging, in a similar fashion as described above with respect to flowchart 1500.

In another embodiment, flowchart 1500 may be performed using procedure calls to debug debuggee application 104. For example, in such an embodiment, execution blocking module 406 may be configured to insert calls into the code of debuggee application 400. Application execution module 410 is configured to execute the code (step 1506 of FIG. 15) after being enabled (step 1504) by debug request message 416 being received by debug control module 402 (step 1502). Application execution module 410 executes the code until an inserted call is reached in the code. At such point, application execution module 410 is blocked from executing further code by message 420 being sent to the debug control module 402 as a method invocation, and debug performed message 424 is transmitted from debug control module 402 (step 1508). Each time another debug request message 416 is received, application execution module 410 returns from the method invoked by message 420 and executes the code until a next call is reached, at which point execution of the code is blocked by a next method invocation of message 420, and a debug performed message 424 is transmitted. An embodiment using procedure calls in this manner may be executed using a single thread, if desired. In such case, the thread may be capable of blocking itself when calls are reached in the executing code, as described above. This can be accomplished, for example, by transmitting messages 412 and 424 using a non-asynchronous form of the send method of XMLHttpRequest (which is an API that provides scripted client functionality for transferring data between a client and server). The send method returning would then act as receiving message 416. While the send method is blocked, application execution module 410 is blocked (as required above) waiting for message 420 to return, which in turn is blocked waiting for message 416 to arrive.

D. Example Embodiments for Terminating Debugging

In an embodiment, debugging of debuggee application 104 by debugger application 102 may be terminated. Such termination of debugging may be implemented in various ways. For instance, FIGS. 17-19 show flowcharts 1700, 1800, and 1900 for terminating debugging, according to example embodiments. FIGS. 17-19 are described with respect to debug system 800 shown in FIG. 8, for purposes of illustration. Other structural and operational embodiments will be apparent to persons skilled in the relevant art(s) based on the discussion regarding FIGS. 17-19, and system 800 of FIG. 8.

For instance, FIG. 17 shows a step 1702 that may be performed by debugger application 102 to terminate debugging, according to an example embodiment. In step 1702, a terminate message is transmitted to the channel manager module. For instance, as shown in FIG. 8, debugger application 102 transmits a terminate message 804 to channel manager module 202. Referring to FIG. 3, for example, terminate message 804 may be generated by debug instruction transmit module 308. For instance, a user that is debugging debuggee application 104 may determine that debugging is complete, and may cause debugger application 102 (e.g., by interacting with debugger application 102 at browser 112) to transmit terminate message 804. Alternatively, terminate message 804 may be transmitted by closing debuggee application 104, by closing a browser that is running debuggee application 104, or in another manner.

FIG. 18 shows a flowchart 1800 that may be performed in channel manager module 202 during termination of debugging, according to an example embodiment. In step 1802, the terminate message is received from the first browser based application. For example, as shown in FIG. 8, terminate message 804 is received by channel manager module 202 from debugger application 102.

In step 1804, the terminate message is transmitted to the second browser based application. For example, as shown in FIG. 8, terminate message 804 is transmitted from channel manager module 202 as terminate message 806 to debuggee application 104.

FIG. 19 shows a flowchart 1900 that may be performed in debuggee application 104 during termination of debugging, according to an example embodiment. In step 1902, the terminate message is received from the channel manager module. For example, as shown in FIG. 8, debuggee application 104 receives terminate message 806. In an embodiment, terminate message 806 may be received from channel repeater module 202 in response to debuggee application 104 transmitting a previous debug performed message 424 to channel repeater module 202 (e.g., during an immediately previous debug cycle).

In step 1904, execution is terminated. In an embodiment, upon receiving terminate message 806, debuggee application 104 terminates.

E. Example Communication Protocol Embodiments

Note that as described above, in embodiments, various protocols may be used by debugger application 102 and debuggee application 104 to communicate through bidirectional communication channel 204. For example, in an embodiment, bidirectional communication channel 204 may be configured according to HTTP (hypertext transfer protocol), and thus communications may be performed through bidirectional communication channel 204 using standard web security mechanisms. Using standard HTTP protocols enables a first browser based application to debug another browser based application. For instance, a first Silverlight™ application may be enabled to debug a second Silverlight™ application without elevation of privilege in this manner.

In an embodiment, bidirectional communication channel 204 may be implemented using a HTTP server (e.g., server computer 108) and standard HTTP protocols. The channel participants may send and receive messages through bidirectional communication channel 204 by performing HTTP posts to an HTTP server. For example, referring to FIG. 8, wait indication 802, start indication 412, debug request message 314, debug performed message 424, and terminate message 804 may each be transmitted to channel manager module 202 as HTTP posts. Start indication 312, debug request message 416, debug performed message 316, and terminate message 806 may each be transmitted from channel manager module 202 as responses to the corresponding HTTP posts by debugger application 102 and debuggee application 104. In an embodiment, bidirectional communication channel 204 can be secured by using HTTPS (hypertext transfer protocol secure) instead of HTTP. With regard to authorization, in an embodiment, standard HTTP authorization techniques can be used, including SharedKey, etc.

Elevation of privilege is not needed if server computer 108 is the server of origin of debugger application 102, as described above, and is the domain of origin for debuggee application 104. If not, standard cross-site scripting techniques can be used by debugger application 102. Debuggee application 104 may use cross-site scripting techniques that enable blocking of execution.

A server can support multiple simultaneous channels by using URI parameters to designate which channel is being used. In an embodiment, this technique may be used, as well as ASP.NET's IHttpAsyncHandler to implement the request handlers to minimize the number of threads consumed while the channel participants are waiting for messages.

The format of messages transmitted through bidirectional communication channel 204 can be any sequence of octets, such as XML (extensible markup language) documents, or other message format type.

As described above, debuggee application 104 is configured to block execution when a breakpoint is reach or a step operation is complete. For example, execution blocking module 406 may enable such blocking, as described above.

IV. Example Low Privilege Debugging Pipeline Embodiments

In an embodiment, bidirectional communication channel 204 may be configured as a low privilege debug channel. For example, a low privilege debugging pipeline may be configured that uses bidirectional communication channel 204 to perform communications between debugger application 102 and debuggee application 104. In an embodiment, the domain of origin HTTP server (e.g., server computer 108) may facilitate communications between debugger application 102 and debuggee application by providing a low privilege debugging pipeline.

For instance, FIG. 20 shows a step 2002 that may be performed by server computer 108, according to an example embodiment. In step 2002, the bidirectional communication channel is configured as a low privilege debugging pipeline. FIG. 21A and 21B illustrate an example of a system 2100 that enables low privilege debugging in accordance with other aspects of the subject matter disclosed herein. System 2100 may include one or more of the following: one or more server computers such as server 2102, etc., and/or one or more client computers 2118, 2120, etc. Server 2102 is an example of server computer 108, and client computers 2118 and 2120 are examples of client computer 106.

A client-to-client debugging connection may be established by connecting a first client process (e.g., browser client 1 2104) to a server (e.g., server computer 2102) via a first connection (e.g., internet protocol connection 2122), connecting a second client process (e.g., browser client 2 2106) to the server computer 2102 via a second connection (e.g., internet protocol connection 2124), and then removing the server from the communication channel, as shown in FIG. 21B, allowing the client processes (e.g., browser client 1 2104 and browser client 2 2106) to communicate directly via a low-privilege pipeline (e.g., low privilege debug pipeline 2114), instead of having the first client download a privileged component that could debug the second client, as in traditional debug models.

For example, suppose an Internet user navigates to a webpage on server 2102 via the user's browser (e.g., browser client 1 2104) and downloads a JAVA applet, some Microsoft Silverlight code, or other application that typically runs on the client within a browser, typically a low privilege component. Suppose that application (the JAVA applet or Silverlight code) opens a second browser (e.g., browser client 2 2106) so that now the client machine has two browser clients running on it. Suppose the application has a number of lines of script code running inside of it. The first browser client (e.g., browser client 2104) can debug the downloaded code by publishing a low privilege debug pipeline (e.g., low privilege debug pipeline 2114) through the use of a low-privilege debug pipeline publisher. The first browser client communicates back to the server 2102 via the low privilege debug pipeline 2114. The server 2102 can forward the low privilege debug pipeline 2114 to the second browser client 2106. The server thus acts as a conduit between the first and second browsers on the client computer 2118. The server 2102 can be optimized out of the connection so that communications, instead of going from one browser on the client machine to a server and back down to the other browser on the client machine, go directly between client browsers on the client computer 2118. That is, the routing of communications can be optimized so that communications are established via the low privilege debug pipeline directly between the two low-privileged browsers running on the client machine, establishing a client-to-client low privilege debug session.

In an embodiment, bidirectional communication channel 204 (including channel repeater module 202) may be implemented in debug pipeline 2114 to enable debugger application 102 and debuggee application 104 to communicate as described herein in a low privilege manner. Further description and examples of a low privilege debugging pipeline applicable to embodiments of the present invention are described in commonly assigned, co-pending U.S. application Ser. No. 12/339,111, titled "Low Privilege Debugging Pipeline," filed on Dec. 19, 2008, which is incorporated by reference herein in its entirety.

V. Further Example Embodiments

FIG. 22 depicts an exemplary implementation of a computer 2200 in which embodiments of the present invention may be implemented. For instance, client computer 106 (FIGS. 1, 6, and 7), server computer 108 (FIGS. 1 and 6), client computer 2118 (FIGS. 21A and 21B), and server computer 2102 (FIGS. 21A and 21B) may be implemented similarly to computer 2200, and may include one or more features of computer 2200 and/or alternative features. Computer 2200 may be a general-purpose computing device in the form of a conventional computer, such as a personal computer, a mobile computer, or a workstation, for example, or computer 2200 may be a special purpose computing device. The description of computer 2200 provided herein is provided for purposes of illustration, and is not intended to be limiting. Embodiments of the present invention may be implemented in further types of computer systems, as would be known to persons skilled in the relevant art(s).

As shown in FIG. 22, computer 2200 includes a processing unit 2202, a system memory 2204, and a bus 2206 that couples various system components including system memory 2204 to processing unit 2202. Bus 2206 represents one or more of any of several types of bus structures, including a memory bus or memory controller, a peripheral bus, an accelerated graphics port, and a processor or local bus using any of a variety of bus architectures. System memory 2204 includes read only memory (ROM) 2208 and random access memory (RAM) 2210. A basic input/output system 2212 (BIOS) is stored in ROM 2208.

Computer 2200 also has one or more of the following drives: a hard disk drive 2214 for reading from and writing to a hard disk, a magnetic disk drive 2216 for reading from or writing to a removable magnetic disk 2218, and an optical disk drive 2220 for reading from or writing to a removable optical disk 2222 such as a CD ROM, DVD ROM, or other optical media. Hard disk drive 2214, magnetic disk drive 2216, and optical disk drive 2220 are connected to bus 2206 by a hard disk drive interface 2224, a magnetic disk drive interface 2226, and an optical drive interface 2228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2230, one or more application programs 2232, other program modules 2234, and program data 2236. Application programs 2232 or program modules 2234 may include, for example, computer program logic (and/or other suitable means) for implementing browser 112, debugger application 102, debuggee application 104, channel repeater module 202, channel establisher module 302, debug initiation module 304, debugger module 306, debug instruction transmit module 308, debug response receiver module 310, debug control module 402, debug start module 404, execution blocking module 406, debug response transmit module 408, application execution module 410, debug pipeline 2114, browser client 2104, browser client 2106, flowcharts 500, 900, 1000, 1100, 1200, 1300, 1400, 1500, 1600, 1700, 1800, 1900, and/or 2000 (including any step of flowcharts 500, 900, 1000, 1100, 1200, 1300, 1400, 1500, 1600, 1700, 1800, 1900 and/or 2000), and/or any further embodiments as described above.

A user may enter commands and information into the computer 2200 through input devices such as keyboard 2238 and pointing device 2240. Other input devices (not shown) may include a microphone, joystick, game pad, satellite dish, scanner, or the like. These and other input devices are often connected to the processing unit 2202 through a serial port interface 2242 that is coupled to bus 2206, but may be connected by other interfaces, such as a parallel port, game port, or a universal serial bus (USB).

A monitor 2244 or other type of display device is also connected to bus 2206 via an interface, such as a video adapter 2246. In addition to the monitor, computer 2200 may include other peripheral output devices (not shown) such as speakers and printers.

Computer 2200 is connected to a network 2248 (e.g., the Internet) through a network interface or adapter 2250, a modem 2252, or other means for establishing communications over the network. Modem 2252, which may be internal or external, is connected to bus 2206 via serial port interface 2242.

As used herein, the terms "computer program medium" and "computer-readable medium" are used to generally refer to media such as the hard disk associated with hard disk drive 2214, removable magnetic disk 2218, removable optical disk 2222, as well as other media such as flash memory cards, digital video disks, random access memories (RAMs), read only memories (ROM), and the like.

As noted above, computer programs and modules (including application programs 2232 and other program modules 2234) may be stored on the hard disk, magnetic disk, optical disk, ROM, or RAM. Such computer programs may also be received via network interface 2250 or serial port interface 2242. Such computer programs, when executed or loaded by an application, enable computer 2200 to implement features of embodiments of the present invention discussed herein. Accordingly, such computer programs represent controllers of the computer 2200.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a browser based debugger application, comprising:
    invoking a channel repeater module to establish a bidirectional communication channel between the browser based debugger application and a second browser based application to be debugged by the browser based debugger application, the browser based debugger application and the second browser based application being enabled to communicate through the bidirectional communication channel without an elevation of privilege using a communication protocol enabled by a browser;
    receiving a start indication from the second browser based application through the channel repeater module, the second browser based application being in a blocked wait state; and
    performing a debug operation on the second browser based application, said performing including
        transmitting a debug request message to the second browser based application through the channel repeater module to cause the second browser based application to transition from the blocked wait state to a run state and to perform a debug action indicated by the debug request message, and
        receiving a response to the debug request message from the second browser based application through the channel repeater module, the second browser based application being transitioned to the blocked wait state from the run state.

2. The method of claim 1, wherein said transmitting a debug request message to the second browser based application through the channel repeater module to cause the second browser based application to transition from the blocked wait state to a run state and to perform a debug action indicated by the debug request message comprises:
    transmitting the debug request message to the channel repeater module, the channel repeater module being configured to transmit the debug request message to the second browser based application as a response to a previous transmission to the channel repeater module by the second browser based application; and
    wherein said receiving a response to the debug request message from the second browser based application through the channel repeater module comprises receiving a response to the debug request message from the channel repeater module that includes a debug performed message transmitted by the second browser based application to the channel repeater module.

3. The method of claim 2, wherein said transmitting a debug request message to the second browser based application through the channel repeater module to cause the second browser based application to transition from the blocked wait state to a run state and to perform a debug action indicated by the debug request message further comprises:
    waiting for a response to the debug request message from the channel repeater module.

4. The method of claim 1, wherein the communication protocol is hypertext transfer protocol (HTTP), and transmissions to the channel repeater module from the browser based debugger application and from the second browser based application are configured according to HTTP.

5. The method of claim 4, wherein the start indication received from the channel repeater module and the response to the debug request message received from the channel repeater module are configured according to a second communication protocol that is not HTTP.

6. The method of claim 1, wherein said invoking a channel repeater module to establish a bidirectional communication channel between the browser based debugger application and a second browser based application comprises:
    invoking the channel repeater module at a server that is remote from a client computer that hosts the browser based debugger application.

7. The method of claim 1, wherein said invoking a channel repeater module to establish a bidirectional communication channel between the browser based debugger application and a second browser based application comprises:
   invoking the channel repeater module in a client computer that hosts the browser based debugger application.

8. The method of claim 1, wherein said receiving a start indication from the second browser based application through the channel repeater module comprises:
   asynchronously receiving the start indication from the channel repeater module as a result of a start indication transmitted by the second browser based application to the channel repeater module.

9. The method of claim 1, further comprising:
   transmitting a wait indication to the channel repeater module;
   navigating a browser to an address for the second browser based application; and
   waiting for a response to the wait indication from the channel repeater module;
   wherein said receiving a start indication from the second browser based application through the channel repeater module comprises
      receiving the start indication from the channel repeater module in response to the wait indication and as a result of a start indication transmitted by the second browser based application to the channel repeater module.

10. The method of claim 1, wherein the debug request message includes at least one of a set break point instruction, a run instruction, or a step instruction, wherein said receiving a response to the debug request message from the second browser based application through the channel repeater module comprises:
   receiving an indication of at least one of the break point being reached or the step being complete.

11. The method of claim 1, wherein said invoking a channel repeater module to establish a bidirectional communication channel between the browser based debugger application and a second browser based application comprises:
   configuring the bidirectional communication channel as a low privilege debugging pipeline.

12. A browser based debugger application, comprising:
   one or more computer processors;
   a channel establisher module, implemented using at least one of the one or more computer processors, configured to invoke a channel repeater module to establish a bidirectional communication channel between the browser based debugger application and a second browser based application to be debugged by the browser based debugger application, the browser based debugger application and the second browser based application being enabled to communicate through the bidirectional communication channel without an elevation of privilege using a communication protocol enabled by a browser;
   a debug initiation module, implemented using at least one of the one or more computer processors, configured to receive a start indication from the second browser based application through the channel repeater module; and
   a debugger module, implemented using at least one of the one or more computer processors, configured to perform one or more debug operations on the second browser based application, the debugger module including
      a debug instruction transmit module, implemented using at least one of the one or more computer processors, configured to transmit a debug request message to the second browser based application through the channel repeater module to cause the second browser based application to transition from a blocked wait state to a run state and to perform a debug action indicated by the debug request message, and
      a debug response receiver module configured, implemented using at least one of the one or more computer processors, to receive a response to the debug request message from the second browser based application through the channel repeater module, the second browser based application being transitioned to the blocked wait state from the run state.

13. The browser based debugger application of claim 12, wherein the communication protocol is hypertext transfer protocol (HTTP), and the debug instruction transmit module is configured to transmit debug request messages to the channel repeater module as hypertext transfer protocol (HTTP) posts.

14. The browser based debugger application of claim 13, wherein the start indication received from the channel repeater module and the response to the debug request message received from the channel repeater module are configured according to a second communication protocol that is not HTTP.

15. The browser based debugger application of claim 12, wherein the browser based debugger application is configured to invoke the channel repeater module at a server that is remote from a client computer that hosts the browser based debugger application.

16. The browser based debugger application of claim 12, wherein the browser based application is configured to invoke the channel repeater module in a client computer that hosts the browser based debugger application.

17. The browser based debugger application of claim 12, wherein the debug initiation module is configured to asynchronously receive the start indication from the channel repeater module as result of a start indication transmitted by the second browser based application to the channel repeater module.

18. The browser based debugger application of claim 12, wherein the debug initiation module is configured to transmit a wait indication to the channel repeater module, to navigate a browser to an address for the second browser based application, and to wait for a response to the wait indication from the channel repeater module;
   the start indication being received by the debug initiation module from the channel repeater module in response to the wait indication transmitted by the browser based debugger application to the channel repeater module and as result of a start indication transmitted by the second browser based application to the channel repeater module.

19. The browser based debugger application of claim 12, wherein the debug instruction transmit module is configured to transmit the debug request message to the channel repeater module, the channel repeater module being configured to transmit the debug request message to the second browser based application as a response to a previous transmission to the channel repeater module by the second browser based application;
   the debug response receiver module being further configured to receive a response to the debug request message from the channel repeater module as a result of a debug performed message transmitted by the second browser based application to the channel repeater module.

20. A computer program product comprising a computer-readable storage medium having computer program logic recorded thereon for enabling a processor to debug a debuggee application using a debugger application, comprising:

first computer program logic that enables the processor to invoke a channel repeater module to establish a bidirectional communication channel between a debuggee application and the debuggee application, the debugger and debuggee applications being enabled to communicate through the bidirectional communication channel without an elevation of privilege using a communication protocol enabled by a browser;

second computer program logic that enables the processor to receive a start indication from the debuggee application through the channel repeater module, the debuggee application being in a blocked wait state; and third computer program logic that enables the processor to perform a debug operation on the debuggee application, said third computer program logic including computer program logic that enables the processor to transmit a debug request message to the debuggee application through the channel repeater module to cause the debuggee application to transition from the blocked wait state to a run state and to perform a debug action indicated by the debug request message, and computer program logic that enables the processor to receive a response to the debug request message from the debuggee application through the channel repeater module, the debuggee application being transitioned to the blocked wait state from the run state.

* * * * *